United States Patent Office 3,330,025
Patented July 11, 1967

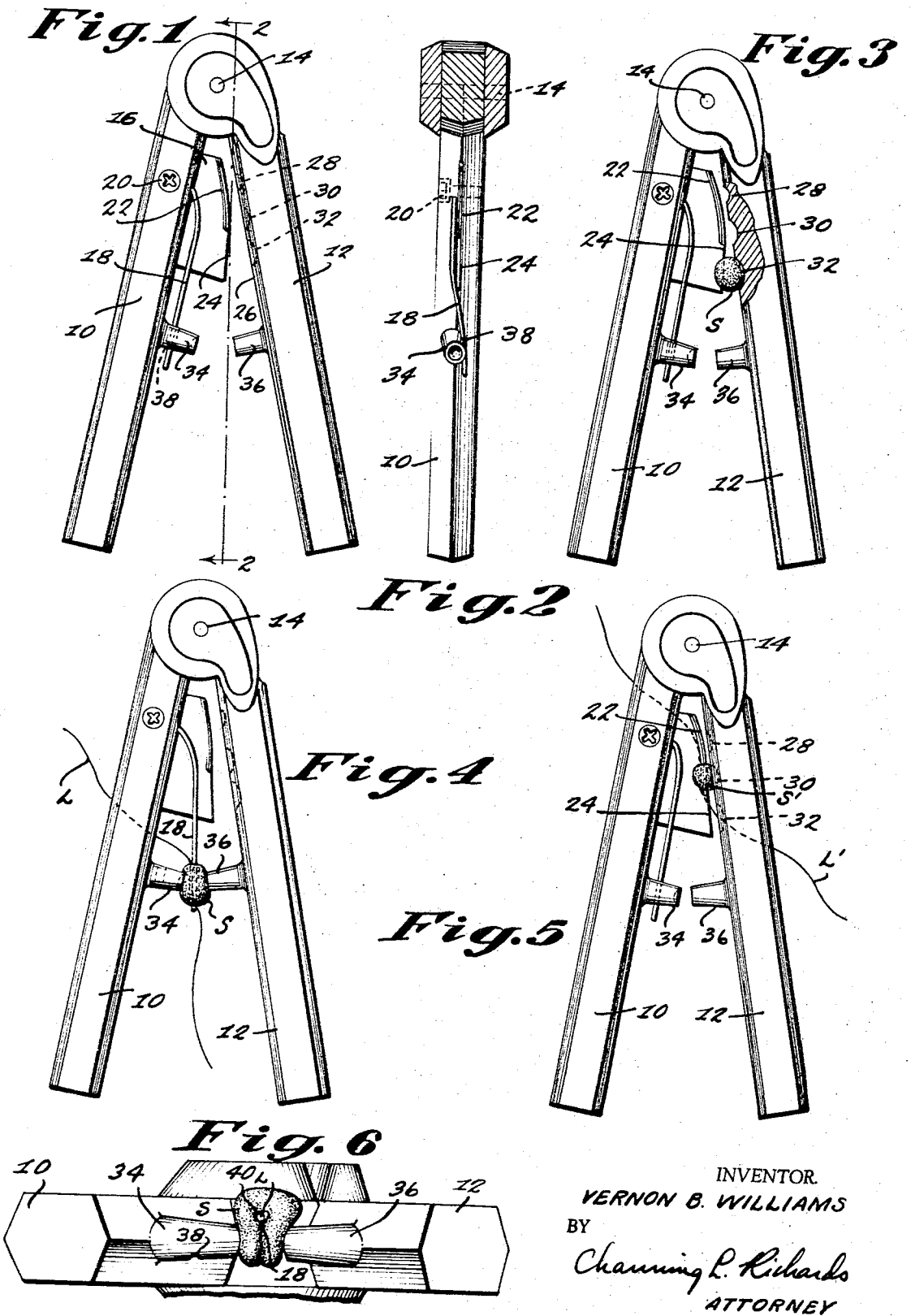

3,330,025
METHOD AND MEANS FOR APPLYING A SLIP SINKER TO A FISHING LINE
Vernon B. Williams, Rte. 4, Box 474, Morganton, N.C. 28655
Filed Apr. 20, 1964, Ser. No. 361,045
9 Claims. (Cl. 29—437)

This invention relates to a method and means for applying a sinker to a fishing line in freely slidable relation thereto and without the necessity of removing the terminal rig of the fishing line.

It is desirable in many instances to have a fishing line freely slidable within an associated sinker to obtain the benefit of the weight of the sinker during casting and to retain the freedom of movement of the fishing line and attached bait after the cast has been made. While the advantage of slip sinkers are well known, the use of these sinkers is restricted because of the time and effort involved in applying them to a fishing line, particularly where the angler desires periodically to switch from a fixed sinker to a slip sinker and vice versa as may be dictated by changing fishing conditions. Heretofore, to attach a slip sinker to a fishing line having a terminal rig comprising hooks, bait and the like, the terminal rig had to be removed to permit the fishing line to be threaded through a preformed bore in the slip sinker and the terminal rig then had to be refastened to the end of the fishing line. By the present invention, a slip sinker may be quickly and easily applied to a fishing line without the necessity of removing the terminal rig, and an ordinary split shot, which is normally used only as a fixed weight, may be employed as a slip sinker.

The method and means of the present invention is generally characterized by placing a portion of the fishing line in the open split of a shot, temporarily filling an additional portion of the open split such as by a wire mandrel; clamping shut the partially filled split and then removing the temporary filling so as to leave the fishing line freely slidable in the clamped split of the shot. In addition, a knife element may be provided to enlarge the open split and to reopen a closed split.

These and other features of the present invention are described in further detail below in connection with the accompanying drawings, in which:

FIG. 1 is a front elevation of the tool with the pivoted arms in retracted position;

FIG. 2 is a right side elevation of the tool taken along the line 2—2 in FIG. 1;

FIG. 3 is a front elevation of the tool illustrating one application thereof;

FIG. 4 is a front elevation of the tool illustrating another application thereof;

FIG. 5 is a front elevation of the tool illustrating a still further application thereof; and FIG. 6 is an enlarged end view of the tool substantially as illustrated in FIG. 4.

The representative embodiment illustrated in the drawings comprises a pair of matched arms 10, 12 made of a light, hard material such as aluminum and pivoted at the upper ends thereof by a pivot bolt 14. The left-hand arm 10 has a knife element 16 and a flexible wire mandrel 18 attached thereto by a common fastening screw 20; the knife element 16 has a sharpened edge portion 22 and a blunt edge portion 24, and extends in a direction toward the opposite surface 26 of the right arm member 12 which has indentures 28, 30 and 32 of varying sizes for purposes to be described in further detail below.

The flexible wire mandrel 18 is bent so as to extend beyond two oppositely disposed anvil members 34, 36 located on the arms 10 and 12, respectively, and has sufficient internal bias normally to position itself substantially midway between the arms 10 and 12 and on one side of the plane of movement of the anvil members 34, 36 when the arms 10 and 12 are pivoted about pivot bolt 14; a lateral slot 38 formed at the shank of anvil member 34 is disposed on the other side of the plane of anvil movement so that the mandrel 18 may be moved against its bias and placed therein for retention when not in use (FIG. 2).

With this arrangement of elements, FIGS. 3–6 illustrate the various operations of the tool. When an ordinary split shot S is to be applied to a fishing line L, the shot S is placed in the lowermost indenture 32 with the V-shaped split facing the knife element 16, and the two arms 10 and 12 are squeezed together so that the blunt edge 24 of knife element 16 will enlarge the split and eliminate the sharp crevice therein by forming a relatively smooth bottom surface 40 (FIG. 6) over which the line L will slide easily. If a solid shot is to be used, it first would be placed in the middle indenture 30 whereupon the sharpened edge 22 of the knife element 16 will cause a split to be formed in the solid shot in a manner similar to the operation illustrated in FIG. 5 and, after forming the split, the shot would then be placed in lowermost indenture 32 for enlarging and forming the split just as with the ordinary split shot S. The upper indenture 28 serves a similar purpose as the middle indenture 30 except that it is made much smaller and finds particular application in forming splits in small shots such as the solid pellets from No. 4 or No. 6 shotgun shells used to good advantage in fly fishing.

After enlarging the split by blunt edge 24, the wire mandrel 18 is removed from the retaining slot 38 and permitted to spring to the other side of the anvil plane of movement. A portion of the fishing line L is placed in the enlarged split which is positioned about the mandrel 18 and the shot S is moved against the bias of mandrel 18 until it is positioned between the anvil members 34, 36 with the mandrel 18 located adjacent the anvil plane of movement whereupon the arms 10, 12 are squeezed together and the open edge portion of the split is clamped shut about the fishing line L and the mandrel wire 18 as illustrated in FIGS. 4 and 6. The mandrel wire 18, of course, prevents the anvil members 34, 36 from clamping the split too tightly about the fishing line L and when the arms 10, 12 are released and the shot S is slid off the end of the mandrel wire 18, the fishing line L is left freely movable in the closed split so that the shot S is slidably disposed thereon.

In addition to its unique function of applying a slip sinker to a fishing line, the tool of the present invention is capable of performing various ancillary functions thereby adding to its over-all versatility. For example, the sharpened knife edge 22 may be used to remove a shot S' from a fishing line L' by cutting the shot S' as illustrated in FIG. 5 regardless of whether the shot S' is a slip sinker or a fixed sinker. Similarly, the anvil members 34 and 36 may be used without the wire mandrel 18 to clamp a fixed sinker to a line in a conventional manner. Also, the sharpened knife edge 22 can be used for cutting fishing line or the like.

The present invention has been described in detail above for purposes of illustration only and is not intended to be limited by the description or otherwise except as defined in the appended claims.

I claim:

1. A tool for applying a split shot to a fishing line in sliding relation thereto comprising a pair of pivotally connected arms, a mandrel wire connected to one of said arms, and clamping means including two oppositely disposed anvil members located on said pivoted arms near enough to said mandrel wire to be capable of closing the open split of a shot containing said mandrel wire and a portion of said fishing line whereby said shot will be slidably disposed on said fishing line when said mandrel wire is removed from said closed split.

2. A tool as defined in claim 1 and further characterized in that one of said pivoted arms has a knife element attached thereto, said knife elements having a sharp edge portion and a blunt edge portion, both of which are disposed to coact with a portion of the other of said pivoted arms whereby a shot having a closed split may be reopened by said sharp edge portion and an open shot split may be enlarged by said blunt edge portion for sliding disposition on a fishing line.

3. A tool for applying a split shot to a fishing line in sliding relation thereto comprising a pair of pivotally connected arms, clamping means including two oppositely disposed anvil members located on said pivoted arm so as to move toward one another when said arms are pivoted, and a mandrel wire connected to one of said pivoted arms and mounted so as to be capable of disposition adjacent the plane of movement of said anvil members whereby said mandrel wire may be inserted in the split of said shot concurrently with a portion of said fishing line and positioned to permit said anvil members to close said split containing said mandrel wire and the portion of said fishing line.

4. A tool for applying a split shot to a fishing line in sliding relation thereto comprising two arms pivotally connected at the ends thereof, a mandrel wire element secured to one of said pivoted arms and extending in a direction substantially parallel with said one arm and away from said pivot point, two oppositely disposed anvil members located on said pivoted arms and within said extent of said mandrel wire, one of said anvil members having a lateral slot at the shank thereof for retaining said mandrel wire in an inoperative position when not in use, said mandrel wire being flexible for disposition adjacent the plane of movement of said anvil members when released from said slot portion whereby said mandrel wire may be inserted in the split of said shot concurrently with a portion of said fishing line and positioned to permit said anvil members to close said split containing said mandrel wire and the portion of said fishing line thereat, and a knife element attached to one of said pivoted arms near the pivoted end thereof and disposed so as to extend in a direction towards the other of said pivoted arms to coact therewith, said knife element including a sharp edge portion for reopening the closed split of a shot and a blunt edge portion to enlarge an open split of a shot for sliding disposition on a fishing line.

5. The method of applying a split shot to a fishing line in sliding relation thereto comprising the steps of: placing a portion of said fishing line in the open split of a shot, temporarily filling an additional portion of said open split, clamping shut the unoccupied portion of said split, and removing the temporarily filling from said closed split whereby said fishing line will be freely slidable in said clamped split.

6. The method of applying a split shot to a fishing line in sliding relation thereto comprising the steps of: placing a portion of said fishing line in the open split of a shot, additionally placing a mandrel element in said open split, clamping shut said split about said fishing line and said mandrel element, and withdrawing said mandrel element from said clamped split whereby said fishing line will be freely slidable in said clamped split.

7. The method of applying a split shot to a fishing line in sliding relation thereto comprising the steps of: enlarging the split in said shot sufficiently for sliding disposition on said fishing line, placing a portion of the fishing line in said enlarged split, additionally placing a mandrel wire in said enlarged split, clamping shut the open edge portions of said split about said fishing line portion and said mandrel wire, and removing said mandrel wire from said clamped split whereby said fishing line will be freely slidable in said clamped split.

8. A tool for applying a split shot to a fishing line in sliding relation thereto comprising a pair of movably connected arms, a mandrel wire connected to one of said arms, and clamping means including two oppositely disposed anvil members located on said arms near enough to said mandrel wire to be capable of closing the open split of a shot containing said mandrel wire and a portion of said fishing line whereby said shot will be slidably disposed on said fishing line when said mandrel wire is removed from said closed split.

9. A tool for applying a split shot as defined in claim 8 and further characterized in that said arms and said anvil members located thereon are movable in a plane adjacent to the location of said mandrel wire.

References Cited

UNITED STATES PATENTS

| | | | |
|---|---|---|---|
| 594,852 | 12/1897 | Brunell | 7—5.2 X |
| 2,177,007 | 10/1939 | Smith | 43—44.88 |
| 2,183,818 | 12/1939 | Minser | 43—44.88 |
| 2,199,113 | 4/1940 | Peirce | 29—416 X |
| 2,571,819 | 10/1951 | Boel et al. | 7—5.5 X |
| 2,653,332 | 9/1953 | Precious | 7—5.1 |
| 3,172,319 | 3/1965 | Stanfield | 7—4 X |

CHARLIE T. MOON, *Primary Examiner.*